(No Model.)
C. A. WILLIAMS.
CORN SHELLER.
No. 349,553. Patented Sept. 21, 1886.
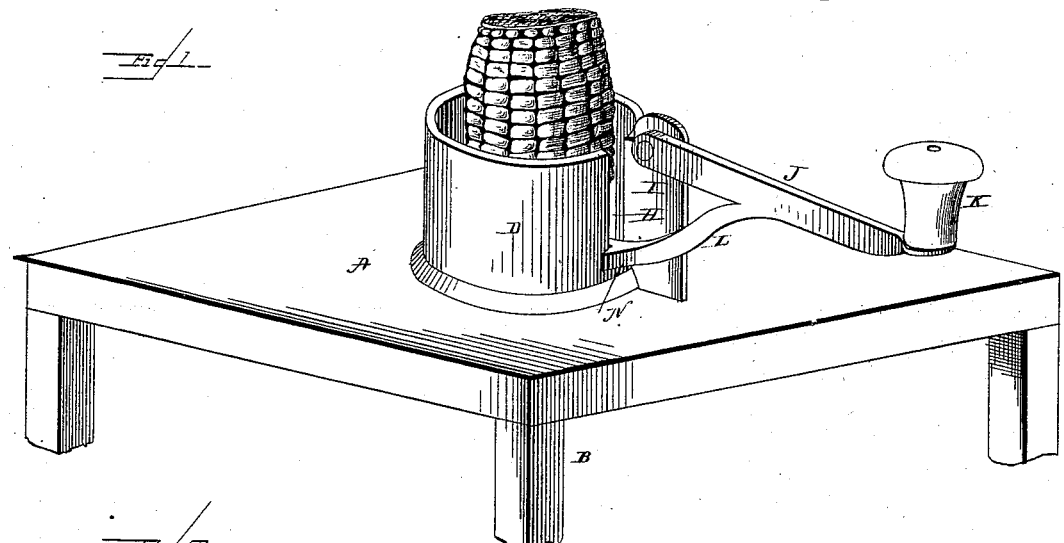
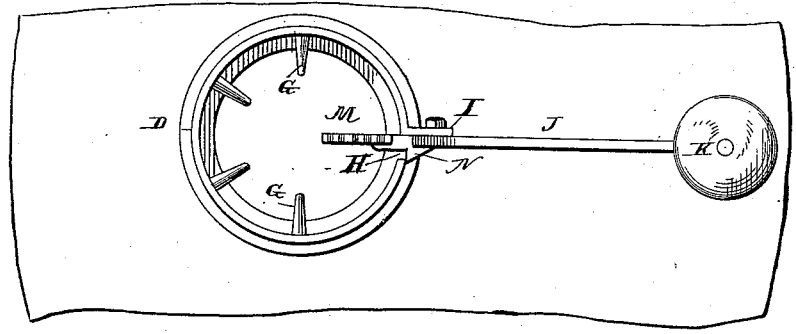
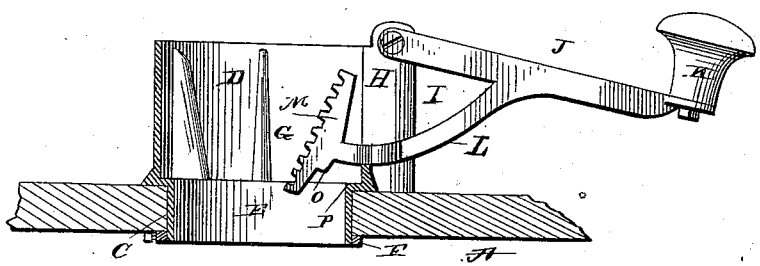
WITNESSES
F. L. Ourand
Edward Stanton
Charles A. Williams
INVENTOR
By Louis Bagger & Co
Attorney

UNITED STATES PATENT OFFICE.

CHARLES A. WILLIAMS, OF WARREN, INDIANA.

CORN-SHELLER.

SPECIFICATION forming part of Letters Patent No. 349,553, dated September 21, 1886.

Application filed April 30, 1886. Serial No. 200,711. (No model.)

*To all whom it may concern:*

Be it known that I, CHARLES A. WILLIAMS, a citizen of the United States, and a resident of Warren, in the county of Huntington and State of Indiana, have invented certain new and useful Improvements in Corn-Shellers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved corn-sheller, showing the parts in position for operation. Fig. 2 is a top view of the sheller, and Fig. 3 is a vertical sectional view of the same.

Similar letters of reference indicate corresponding parts in all the figures.

My invention has relation to corn-shellers; and it consists in the improved construction and combination of the parts of the sheller, in which the corn is inserted in a sleeve having longitudinal flanges in the inner side, and having a lever pivoted in a slot in the sleeve and provided at its inner end with a serrated scraper, as hereinafter more fully described and claimed.

In the accompanying drawings, the letter A indicates a board, which is mounted upon legs B, and formed with a circular perforation, C. A sleeve or rim, D, is secured within the perforation by means of a reduced portion, E, and a removable collar, F, secured around the lower end of the reduced portion. A handle or lever, J, for rotating the sleeve, is pivotally secured at the top of an outwardly-projecting flange, I, and is provided at its outer end with a knob, K. The lever J is provided with a curved arm, L, which moves in a slot, H, in the side of the sleeve at one side of the flange I. The inner end of this arm is provided with a cross-head or scraper, M, the inner edge of which is provided with teeth or serrations which engage with the grains of corn and break them from the cob when the sleeve is rotated back and forth by means of the handle J, and the ear is held stationary within the sheller by one hand of the operator.

To assist the scraper in shelling the corn, the interior of the sleeve is provided with a series of vertical inwardly-projecting flanges, G, the lower portions of which are wider than the tops, and against which the corn is pressed by means of a downward pressure applied to the outer end of the handle J. To prevent the lower end of the scraper from being pressed too hard against the corn-cob after the corn has been removed, the arm L is provided with a lip or projection, N, which bears against the outside of the sleeve at the side of the slot H; and to prevent the withdrawal of the scraper M from the sleeve when the outer end of the lever J is raised to permit of the insertion of the end of an ear, the lower end of it is made to project slightly into the reduced portion E, and is provided with a shoulder, O, which bears against the interior of the sleeve at P. After the grains of corn have been shelled from one end of the ear it is taken out of the sleeve, reversed, and the unshelled end inserted.

It will be seen that the device is exceedingly simple, and that the liability of breakage of parts is very slight.

Having thus described my invention, I claim—

1. In a corn-sheller, the combination of a sleeve having vertical inwardly-projecting flanges and a vertical slot in one side, a lever pivoted in said slot, the inner end of which is provided with a scraper and the outer end with a handle, and means for securing the sleeve to a board or table.

2. In a corn-sheller, the combination of a sleeve having a reduced portion, a series of vertical flanges upon its inner side, a slot in one side, and an outwardly-projecting flange at one side of said slot, a removable collar and a lever pivoted to said flange, said lever being provided with a serrated scraper at one end and a knob or handle at the other.

3. In a corn-sheller, the combination of a sleeve having a reduced lower portion forming a shoulder upon its inner side, and a slot in its upper portion, a lever pivoted in said slot, having a handle at its outer end, a scraper secured to the inner end of said lever, having its lower end projecting into the reduced portion of said sleeve, and a lip upon the side of said lever outside of said sleeve.

In testimony that I claim the foregoing as my own I have hereunto affixed my signature in presence of two witnesses.

CHARLES A. WILLIAMS.

Witnesses:
JOSEPH G. PURVIANCE,
JAMES SMITH.